(12) United States Patent
Bernhard et al.

(10) Patent No.: US 10,801,947 B2
(45) Date of Patent: Oct. 13, 2020

(54) CALIBRATION INSERT, AND MOUNT OF THE SAME

(71) Applicant: Endress+Hauser Conducta GmbH+Co. KG, Gerlingen (DE)

(72) Inventors: Ralf Bernhard, Stuttgart (DE); Matthias Grossmann, Vaihingen-Enz (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 0 days.

(21) Appl. No.: 16/103,020

(22) Filed: Aug. 14, 2018

(65) Prior Publication Data

US 2019/0049363 A1    Feb. 14, 2019

(30) Foreign Application Priority Data

Aug. 14, 2017    (DE) .................. 10 2017 118 499

(51) Int. Cl.
*G01N 21/01*    (2006.01)
*G01N 21/49*    (2006.01)
(Continued)

(52) U.S. Cl.
CPC ........... *G01N 21/01* (2013.01); *G01N 21/278* (2013.01); *G01N 21/4785* (2013.01);
(Continued)

(58) Field of Classification Search
CPC ........ G01N 21/01; G01N 21/49; G01N 21/55; G01N 21/4785; G01N 21/278; G01N 21/59; G01N 2021/0106; G01N 2021/4716

See application file for complete search history.

(56) References Cited

U.S. PATENT DOCUMENTS 2,244,507 A    6/1941    Thomas et al.
4,231,663 A    11/1980   Phillippi
(Continued)

FOREIGN PATENT DOCUMENTS

AT    399053 B    3/1995

OTHER PUBLICATIONS

Search Report for German Patent Application No. 10 2017 118 499.6, German Patent Office, dated Apr. 6, 2018, 7 pp.

*Primary Examiner* — Sang H Nguyen
(74) *Attorney, Agent, or Firm* — Kelly J. Smith; Endress+Hauser (USA) Holding Inc.

(57) ABSTRACT

The present disclosure relates to a calibration insert for the adjustment, calibration, and/or implementation of a function test of an optical sensor that is designed to measure at least one measurand in a medium by means of light, the calibration insert including: an inlet cross-section through which light enters into the calibration insert; an outlet cross-section through which light exits from the calibration insert; and at least one blocking element that is arranged between the inlet cross-section and the outlet cross-section, wherein the blocking element does not entirely let through the light, independently of its wavelength, from the inlet cross-section to the outlet cross-section. Instead, the blocking element partially absorbs, reflects, or scatters the light, wherein the ratio of the intensity of the light at the outlet cross-section to the intensity of the light at the inlet cross-section corresponds to a value of the measurand.

16 Claims, 5 Drawing Sheets

(51) Int. Cl.
*G01N 21/55* (2014.01)
*G01N 21/59* (2006.01)
*G01N 21/27* (2006.01)
*G01N 21/47* (2006.01)

(52) U.S. Cl.
CPC .............. *G01N 21/49* (2013.01); *G01N 21/55* (2013.01); *G01N 21/59* (2013.01); *G01N 2021/0106* (2013.01); *G01N 2021/4716* (2013.01)

(56) References Cited

U.S. PATENT DOCUMENTS

| | | | | |
|---|---|---|---|---|
| 4,725,147 | A * | 2/1988 | Stoddart | G01N 21/274 356/243.1 |
| 4,931,659 | A | 6/1990 | Sabater et al. | |
| 5,517,314 | A * | 5/1996 | Wallin | G01N 21/274 250/252.1 |
| 5,726,750 | A * | 3/1998 | Ito | G01N 21/359 209/587 |
| 6,094,265 | A | 7/2000 | Ishikawa et al. | |
| 6,456,379 | B1 * | 9/2002 | Kunz | G08B 17/103 340/620 |
| 6,504,154 | B2 * | 1/2003 | Iida | G01N 21/3563 250/339.06 |
| 7,151,606 | B2 * | 12/2006 | Taniguchi | G01N 21/359 356/432 |
| 7,675,623 | B2 * | 3/2010 | Tsuneishi | G01N 21/4785 356/243.1 |
| 2003/0020909 | A1 * | 1/2003 | Adams | G01J 3/28 356/326 |
| 2003/0156281 | A1 * | 8/2003 | Crezee | B07C 5/342 356/243.1 |
| 2005/0168737 | A1 * | 8/2005 | Bradshaw | G01N 21/274 356/319 |
| 2009/0153850 | A1 * | 6/2009 | Nielsen | A61B 5/0091 356/243.1 |
| 2011/0023575 | A1 * | 2/2011 | Al-Ali | A61B 5/02416 73/1.03 |
| 2012/0162755 | A1 * | 6/2012 | Stroessner | G02B 5/005 359/386 |
| 2014/0362381 | A1 * | 12/2014 | Lindmuller | G01N 21/278 356/408 |
| 2017/0102317 | A1 * | 4/2017 | Bertsch | G01N 21/17 |

* cited by examiner

CALIBRATION INSERT, AND MOUNT OF THE SAME

CROSS-REFERENCE TO RELATED APPLICATION

The present application is related to and claims the priority benefit of German Patent Application No. 10 2017 118 499.6, filed on Aug. 14, 2017, the entire contents of which are incorporated herein by reference.

TECHNICAL FIELD

The present disclosure relates to a calibration insert for the adjustment, calibration, and/or implementation of a function test of an optical sensor that is designed to measure at least one measurand in a medium by means of light. The present disclosure also relates to a mount for accommodating such a calibration insert.

BACKGROUND

A light source 1 sends radiation 3 through the medium to be measured, which radiation is partially absorbed by the medium and measured with a receiver 2; see Prior Art FIG. 1a. The intensity of the radiation may be determined in the receiver 2, such as, for instance, using a photodiode and converted into a photoelectric current. The final conversion in the absorption units may take place in an associated measuring transducer for example, by means of a calibration diagram and a reference value.

The calibration diagram may also be referred to as the calibration curve and may be obtained in advance via suitable calibration means. Standard fluids 4 are often used for this; see Prior Art FIG. 1a. However, these standard solutions may suffer the following disadvantages: limited stability, repeated use not being possible due to contamination, and high costs to the user. Under certain circumstances, standard solutions may also be health hazards.

Fluids 4 may completely fill the sample chamber 7 just like the samples to be measured, but, as mentioned, may be more complicated to handle. Filters 6 may be simpler to handle; however, the absorption may not occur in the entire measurement volume 7 (sample chamber); see Prior Art FIG. 1b. The absorption values that are defined by the calibration means normally apply only to a specific wavelength or a limited wavelength range. A value for the absorption may not be adjustable by means of filter 6, i.e., if the filter is delivered with an absorption value of approximately 100 a.u. (arbitrary units), the user may be required to calibrate to precisely this one value. With a calibration by means of fluid 4, the user might possibly be required to set his desired calibration value via addition of an additional fluid.

SUMMARY

With optical sensors, it should be possible to perform a universal calibration with calibration means that maintain relative stability over the long term.

The aim may be achieved via a calibration insert comprising: an inlet cross-section through which light enters into the calibration insert; an outlet cross-section through which light exits the calibration insert; and at least one blocking element that is arranged between the inlet cross-section and the outlet cross-section, wherein the blocking element does not entirely transmit the light, independently of its wavelength, from the inlet cross-section to the outlet cross-section, but, rather partially absorbs, reflects, or scatters the light. The ratio of the intensity of the light at the outlet cross-section to the intensity of the light at the inlet cross-section corresponds to a value of the measurand, according to embodiment described herein.

Therefore, a specific value of the measurand may be simulated with the calibration insert, i.e., the sensor may measure, using the calibration insert, a value of the measurand that corresponds to the same value, given a "real" medium.

According to the present application, light is not to be limited to light in the visible range, but, rather, encompasses a wavelength of between about 100-2,000 nm.

In one embodiment, the calibration insert is designed as a diaphragm. In general, a diaphragm is an aperture which limits the expansion of ray beams. The diaphragm is thus a module, comprising at least one base element having at least one aperture and at least one blocking element which does not transmit the light. The absorption via screening may offer an absorption independent of wavelength.

In another embodiment, the calibration insert may be designed as a perforated plate having at least one hole. According to one example, the perforated plate may comprise more than one hole. In another example, the perforated plate may comprise a plurality of holes.

In another embodiment, the calibration insert may include a metal plate or a carrier transparent to the light. For example, plastic or glass may be used wherein the carrier comprises a coating that does not transmit light.

In another embodiment, the hole or holes are round and have a diameter of between about 100-500 µm.

According to some embodiments, which may include diaphragms, the webs between the holes, and thus ultimately the metal plate or the coating, which may not transmit light, may be understood as a blocking element or blocking elements.

The inlet cross-section, introduced above, may be at least a majority of a region that is illuminated by the incident light. The outlet cross-section, also introduced above, may be at least a majority of a region from which light exits from the calibration body.

In one embodiment, the value for the measurand may be adjustable. Various values of the measurand may thereby be simulated by means of the calibration insert. Tolerances in the production of the calibration insert may likewise be compensated for via the adjustment capability. For instance, if a calibration insert is produced to a value of about 98 a.u., but the user would like to calibrate to 100 a.u., this may be achieved via the adjustment capability described herein.

In one embodiment, the calibration insert may include a screw, pin, or bolt to reduce the hole cross-section, and therefore make the calibration insert adjustable.

In another embodiment, the calibration insert may include at least two regions, with each region including a different number of holes, shape of the holes, spacing of the holes, and/or a different homogeneity of their distribution, depending upon the value of the measurand. The value of the measurand, and therefore the calibration insert, may likewise be made adjustable.

In another embodiment, the calibration insert may be designed so that it can be tilted in relation to the radiation direction. For example, the calibration insert may be designed so that it can be displaced in relation to the radiation direction. Further, the calibration insert may be designed so that it can be rotated in relation to the radiation direction. An adjustment capability of the calibration insert can thereby also be achieved. Upon tilting, the projection of the holes may change, and, therefore, their area may change. Upon displacement or rotation, the illuminated region may change, and, therefore, the hole pattern may change.

In yet another embodiment, the calibration insert may be designed as a solid body with an additive, wherein the solid body may be essentially transparent to the light. That is, the additive may not transmit the light, but rather, may absorb the light or reflect the light. Further, the solid body may completely fill a measurement volume of the optical sensor.

The advantage is thus that the absorption occurs spatially distributed over the entire volume, and not only in a partial region where an absorber/filter, etc., is located. The measurement is then very close to a real sample, since the solid body, like the liquid medium, completely fills the measurement space. This is particularly important if the geometry of the sample space deviates from a simple layer of homogeneous thickness, or is variable.

According to some embodiments, the additive may consist of pigments. Pigments may consist of particles and may be insoluble in a calibration insert. For example, the additive may consist of particles or air bubbles that do not dissolve in the material of the blocking elements, but, rather, merely disperse.

BRIEF DESCRIPTION OF THE DRAWINGS

This will be explained in more detail with reference to the following Figs.

In the figures, the same features are identified with the same reference symbols.

DETAILED DESCRIPTION

Figure 1A:
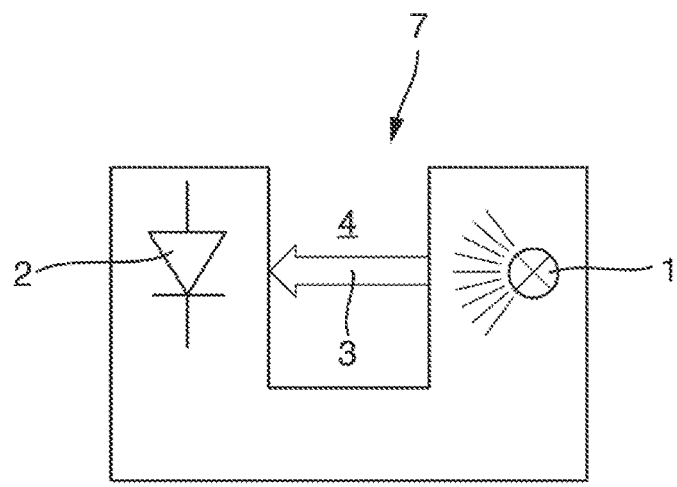
FIG. 1a is a prior art version of a calibration insert.
Figure 1B:
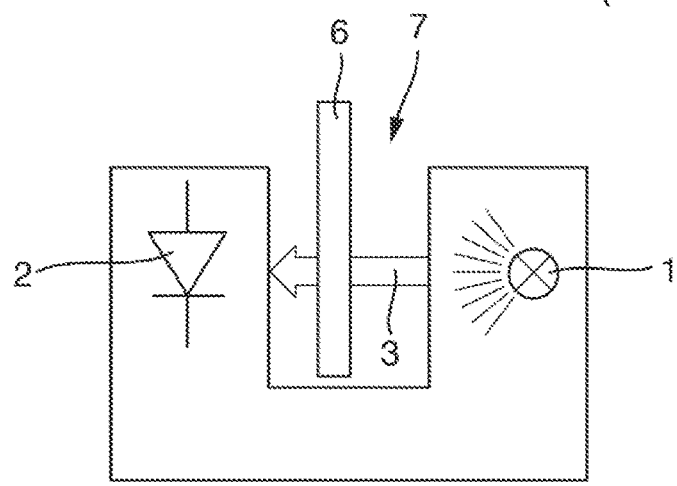
FIG. 1b is another embodiment of a prior art calibration insert.
Figure 2:
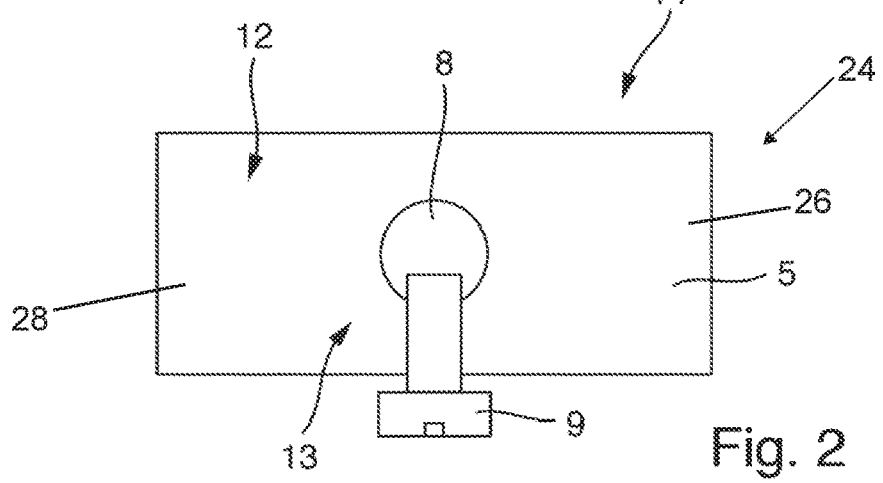
FIG. 2 is an exemplary embodiment of a calibration insert according to the present disclosure.

As stated above, FIG. 1a and FIG. 1b are prior art versions of a calibration insert. FIG. 2 shows an embodiment of a calibration insert 5, according to the present disclosure, that may find applicability to at least a portion of an optical sensor 24. The calibration insert 5, according to the embodiment of FIG. 2, is configured as a diaphragm 26.

The diaphragm 26 may be designed as a perforated plate 28, as shown, having at least one aperture 8. The hole 8 may be an aperture, such as, for example, a bore. The cross-section of the aperture 8 may be varied via an adjustable device. In FIG. 2, this device may be designed as a screw 9 that protrudes a greater distance or a smaller distance into the aperture 8. Since the screw 9 protrudes a greater distance or a smaller distance into the aperture 8, the value of the measurand may be adjusted, because more or less light may pass through the calibration insert 5.

Light 3 from the light source 1 strikes the calibration insert 5 in an inlet cross-section 13 and leaves said calibration insert via the outlet cross-section 14. In the example shown, in which the calibration insert 5 is designed, or configured, as a diaphragm 26, the inlet cross-section 13 is a first side of the diaphragm 26, and the outlet cross-section 14 is a second side of the diaphragm 26.

Light 3 may pass through the hole 8. The hole 8 may be markedly larger than the wavelength of the light. In some instances, light may not to be limited to light in the visible range, but, rather, may encompass a wavelength of about 100-2,000 nm.

There are regions in the calibration insert 5 that may be configured as blocking elements 12. One or more blocking elements 12 do not allow the light 3 through the calibration insert 5; in particular, the light 3 may be absorbed or reflected. The blocking element 12 thereby may not allow light through from the inlet cross-section 13 to the outlet cross-section 14, independently of its wavelength.

Figure 3A:
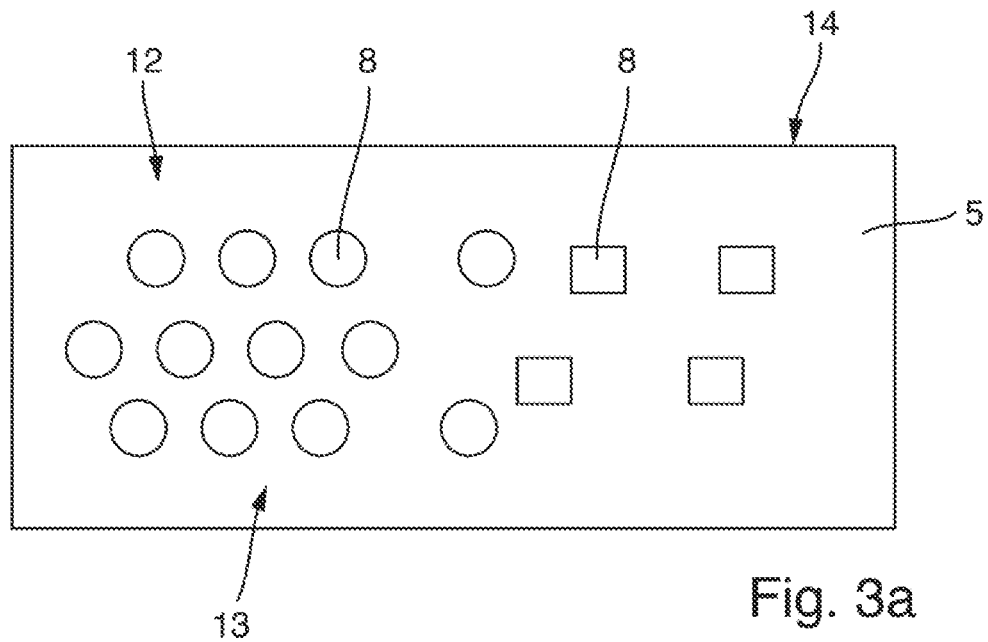
FIG. 3a is another exemplary calibration insert, according to the present disclosure.

FIG. 3a shows an embodiment having multiple apertures 8. The apertures 8 may assume various shapes, such as, for example, round, square, or lamellar. The apertures 8 may have a size of approximately 100-500 µm. In addition, the apertures 8 may be arranged periodically or aperiodically. Further, the apertures 8 may be distributed homogeneously or inhomogeneously across the calibration insert 5. The density of the apertures 8 may likewise be varied across the calibration insert 5.

Figure 3B:
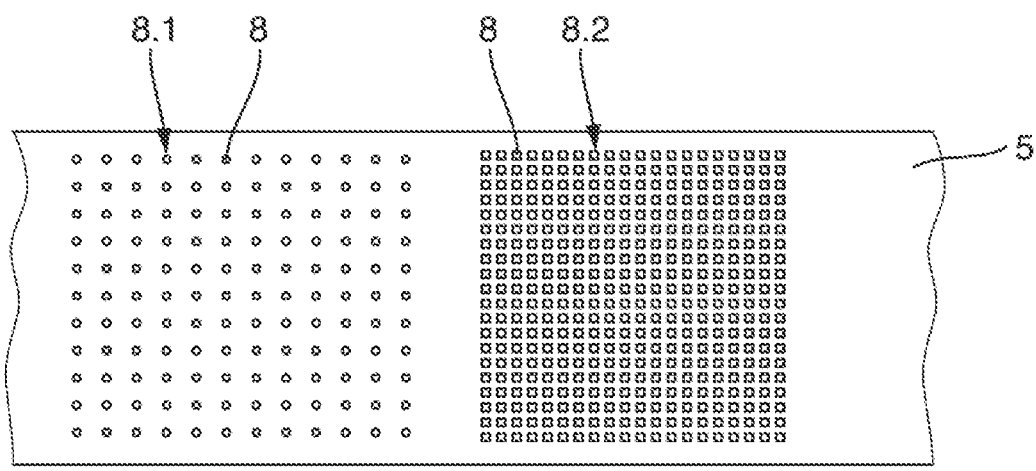
FIG. 3b is also a calibration insert, according to another embodiment of the present disclosure.

FIG. 3b shows a calibration insert 5 having two different regions 8.1 and 8.2. The region 8.1 on the left side may have a lower density of apertures 8 than the right region 8.2. Two different values of the measurand may thereby be simulated, if the calibration insert 5 is accordingly brought into a different position. More regions are also possible. A smooth transition is likewise possible. For instance, the hole density may thus be varied continuously over the length of the calibration insert 5, such that the value of the measurand may be adjusted over a wide range. A calibration insert 5 with multiple regions 8.1 and 8.2 may also be used to calibrate a sensor that comprises more than one light source or multiple path lengths, i.e., different measurement volumes 7. The regions 8.1 and 8.2 are then adapted so that the same value of the measurand is simulated, despite the various path lengths.

The light 3 may pass through the calibration insert 5 via the holes 8. As noted, the holes 8 are larger than the wavelength of the light. Blocking elements 12 may prevent light 3 from passing from the inlet cross-section 13 to the outlet cross-section 14. The blocking element 12 may thus be designed as the webs between the holes 8.

The calibration insert 5 may consist of a thin plate of steel, aluminum, copper, etc., into which the apertures 8 may be introduced via drilling, milling, laser processing, water jet processing, punching, etching, etc., or via generative manufacturing methods (stereolithography, laser sintering, etc.).

The calibration insert 5 may likewise consist of a transparent carrier made of plastic, glass, etc., for example, with an absorbent or reflective coating 12, wherein apertures 8 may be introduced into the coating 12 by various techniques, as above.

Figure 4:
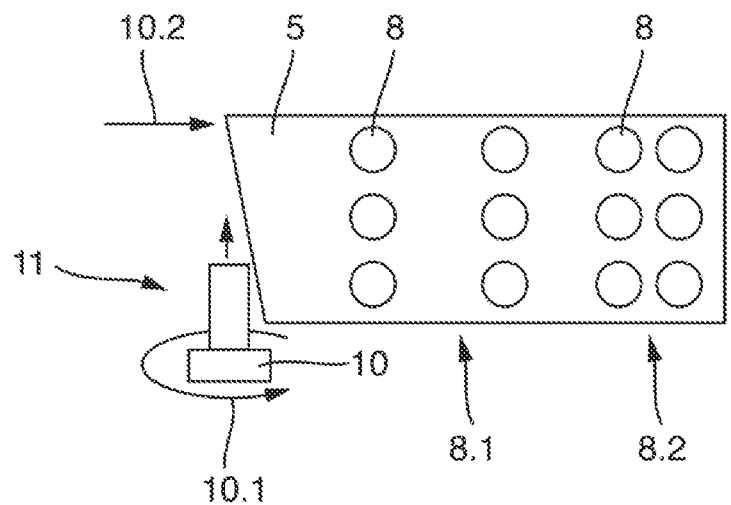
FIG. 4 is the calibration insert from the previous Figs., including an adjustment capability, according to the present disclosure.

FIG. 4 shows an embodiment of the calibration insert 5 having two regions 8.1 and 8.2 that respectively have a different density of apertures 8. The calibration insert 5 may be displaced by means of the mount 11, which may comprise a screw 10 that may be turned (see reference character 10.1). Depending upon the position of the screw 10, the calibration insert 5 may move horizontally, as depicted in the FIG. 4; see arrow 10.2.

Figure 5A:
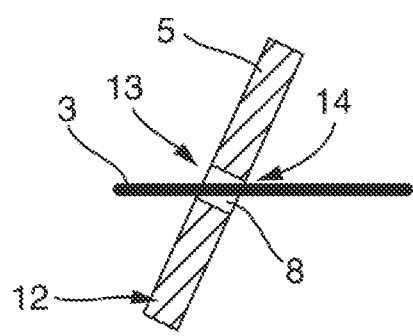
FIG. 5a is a calibration insert having adjustment capabilities, according to an embodiment of the present disclosure.
Figure 5B:
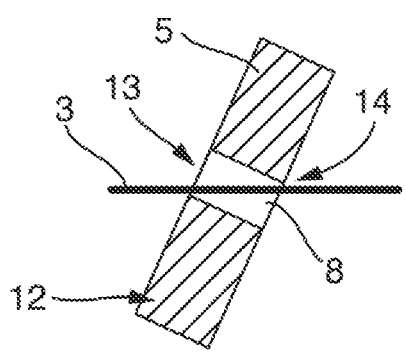
FIG. 5b is a calibration insert with an alternative adjustment capability, having a plate thickness greater than that of FIG. 5a, according to the present disclosure.

FIG. 5a shows an embodiment of the adjustment capability of the value of the measurand. If the calibration insert 5 has a certain thickness, the open face of the apertures 8 may be reduced via tilting. The desired absorption or reflection may be set with a displaceable tilting mechanism. FIG. 5a shows an embodiment having a smaller plate thickness, while FIG. 5b shows an embodiment with a greater plate thickness. For the calibration insert with the greater plate thickness, less light 3 may arrive from the inlet cross-section 13 to the outlet cross-section 14. If the calibration insert 5 is tilted further relative to the light 3, even less light correspondingly may arrive from the inlet cross-section 13 to the outlet cross-section 14, and the value of the measurand may, accordingly, be less.

Figure 6A:
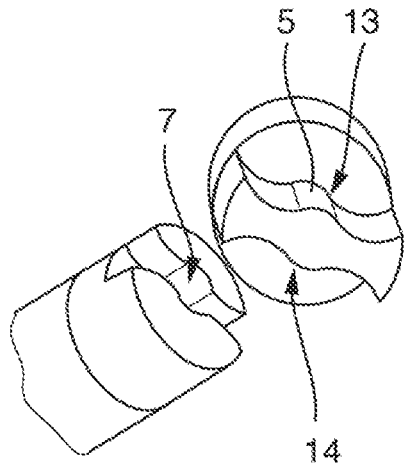
FIG. 6a is an exemplary calibration insert, shown at a stage of insertion relative to a sensor having a measurement volume.
Figure 6B:
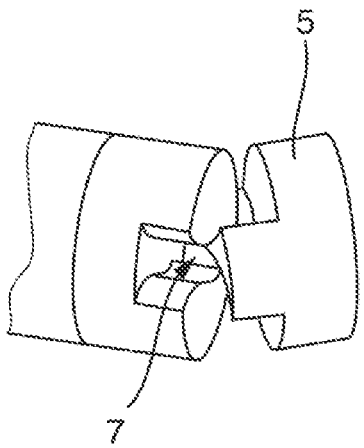
FIG. 6b illustrates the calibration insert and sensor of FIG. 6a, shown at another stage of insertion.
Figure 6C:
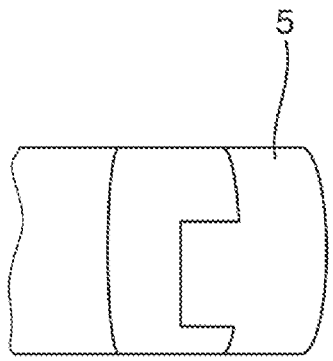
FIG. 6c depicts the calibration insert and sensor of FIG. 6a and FIG. 6b at another stage of insertion.

FIG. 6a, FIG. 6b, and FIG. 6c show an exemplary embodiment of the calibration insert 5. Here, a body may be introduced that completely fills the measurement volume 7. The body may consist of a transparent material such as glass, plastic, a casting compound, or the like. If the calibration insert 5 is designed as a solid, this likewise may comprise an inlet cross-section 13 and an outlet cross-section 14 for the light 3. The desired absorption or reflection may be set via additive substances (pigments, particles, air bubbles, etc.) that may lead to a loss of radiation via absorption or scattering upon passage of light 3. As an example, pigments may consist of particles that are insoluble in the calibration insert 5.

Suitable as pigments are, for instance, carbon black pigments that absorb the light 3, independently of its wavelength. The additive substances may serve as blocking elements 12 that do not transmit the light 3 from the inlet cross-section 13 to the outlet cross-section 14, independently of its wavelength. The shape of the body is established via casting, machining, polishing, laser processing, water jet processing, punching, etching, etc., or via generative manufacturing methods such as stereolithography, laser sintering, etc. FIG. 6a and FIG. 6b show an exemplary calibration insert 5, in addition to a sensor with measurement volume 7. FIG. 6c shows an exemplary calibration insert that has been introduced into the measurement volume 7.

Figure 8:
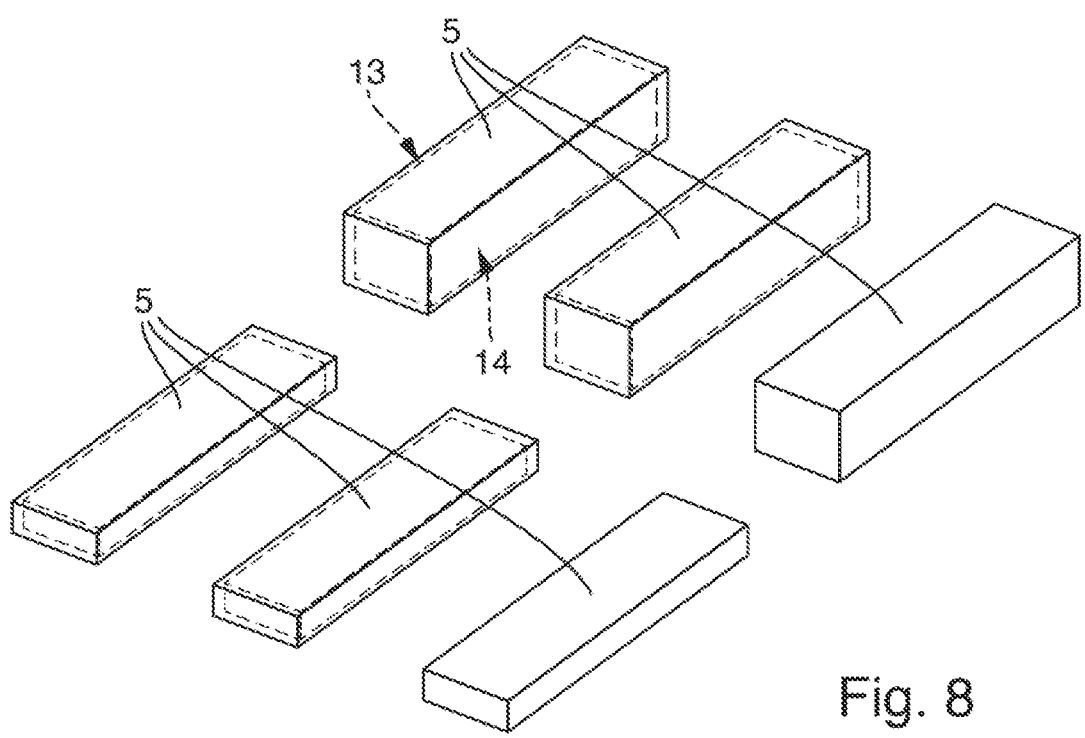
FIG. 8 is a calibration insert, in various embodiments, according to the present disclosure.

FIG. 8 also shows calibration inserts 5. Depicted in the lower row is a calibration insert 5 with a first thickness; in the upper row, the calibration insert 5 is shown with a second thickness. The percentage of additive substances 12 thereby increases from left to right. The calibration inserts 5 in FIG. 8 may be manufactured according to the shape of the measurement volume 7, such that this may be completely filled.

Figure 7:
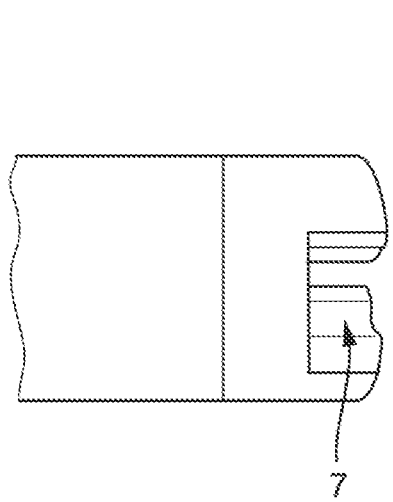
FIG. 7 is a calibration insert with a mount, according to the present disclosure
Figure 7:
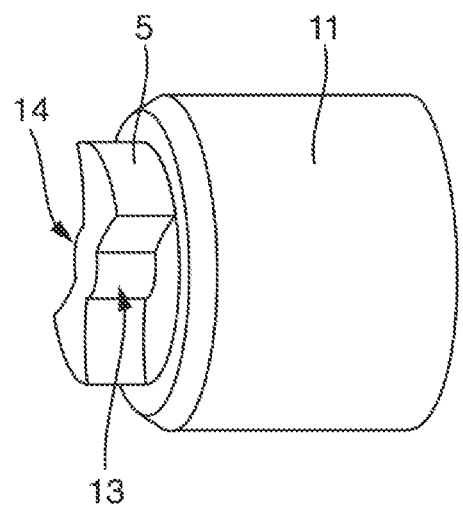

A calibration insert 5 may be attached to a sensor via a mount 11. FIG. 7 shows such a mount, together with calibration insert 5, for the solid described above. To the same extent, a mount 11 may also be used for a calibration insert 5 that is designed as a diaphragm 26. The mount 11 is such that the calibration insert 5 may be exchanged. The sensor to be calibrated may thus be successively loaded with different calibration inserts 5, and thereby with different values for the measurand.

According to the present disclosure, as alternatives to liquid solutions, solids may be considered that are temporarily introduced into the measurement volume 7, and thus into the region in which the medium to be measured is also located during the measurement. Solid standards tend to be stable longer, insofar as aging materials are foregone. Their handling may be additionally less risky than conventional measurement strategies.

The invention claimed is:

1. A calibration insert for the adjustment, calibration, and/or implementation of a function test of an optical sensor that is designed to measure at least one measurand in a medium using light, comprising:
    an inlet cross-section through which a light signal enters into the calibration insert;
    an outlet cross-section through which the same light signal exits from the calibration insert; and
    at least one blocking element arranged between inlet cross-section and outlet cross-section, wherein the blocking element at least partially absorbs, reflects, or scatters the light, and wherein a ratio of an intensity of the light signal at the outlet cross-section to the intensity of the same light signal at the inlet cross-section corresponds to a value of the measurand.

2. The calibration insert according to claim 1, wherein the calibration insert is designed as a diaphragm.

3. The calibration insert according to claim 2, wherein the calibration insert includes a perforated plate having at least one hole.

4. The calibration insert according to claim 3, wherein the perforated plate includes precisely one hole.

5. The calibration insert according to claim 3, wherein the perforated plate includes a plurality of holes.

6. The calibration insert according to claim 3, wherein the holes of the perforated plate are round and have a diameter of 100-500 μm.

7. The calibration insert according to claim 6, the calibration insert embodied such that it is tiltable, displaceable, or rotatable in relation to the radiation direction of the light signal.

8. The calibration insert according to claim 7, wherein the calibration insert is manufactured from glass, plastic, or casting compound.

9. The calibration insert according to claim 3, further comprising a screw, pin, or bolt to close the at least one hole, depending upon the value of the measurand.

10. The calibration insert according to claim 4, further comprising at least two regions, wherein each of the two regions comprises a different count, shape of the holes, spacing of the holes, and/or a different homogeneity of their distribution, depending upon the value of the measurand.

11. The calibration insert according to claim 2, wherein the calibration insert includes a metal plate or a carrier transparent to the light signal.

12. The calibration insert according to claim 11, wherein the insert includes plastic or glass, and wherein the carrier includes a coating that reduces light transmission.

13. The calibration insert according to claim 1, wherein the value of the measurand is adjustable.

14. The calibration insert according to claim 1:
    wherein the calibration insert is designed as a solid body with an additive substance;
    wherein the solid body is essentially transparent to the light signal;

wherein the additive substance reduces the transmission of the light signal; and wherein the solid body completely fills a measurement volume of the optical sensor.

15. The calibration insert according to claim 14, wherein the additive substance consists of pigments.

16. The calibration insert according to claim 1, further including a mount for accommodating the calibration insert.

\* \* \* \* \*